United States Patent [19]

Lauterbach

[11] 4,277,116

[45] Jul. 7, 1981

[54] BEARING CONSTRUCTION AND RETAINER THEREFOR

[75] Inventor: Jerre F. Lauterbach, Columbus, Ind.

[73] Assignee: Cummins Engine Company, Inc., Columbus, Ind.

[21] Appl. No.: 85,803

[22] Filed: Oct. 17, 1979

[51] Int. Cl.³ .............................................. F16C 33/38
[52] U.S. Cl. .................................... 308/188; 308/193; 308/201
[58] Field of Search ............... 308/201, 188, DIG. 11, 308/189 R, 193, 195, 197, 189 A

[56] References Cited

U.S. PATENT DOCUMENTS

| | | | |
|---|---|---|---|
| 3,649,093 | 3/1972 | Muratore et al. | 308/201 |
| 3,649,094 | 3/1972 | Russell | 308/201 |
| 3,994,544 | 11/1976 | Flatland | 308/188 |

Primary Examiner—Lenard A. Footland
Attorney, Agent, or Firm—Neuman, Williams, Anderson & Olson

[57] ABSTRACT

A bearing particularly suitable for high-speed operation is provided and includes inner and outer races, a plurality of spherical elements disposed between the races and in rolling contact therewith, and a retainer disposed between the races and maintaining the elements in annularly spaced relation. The retainer is of molded one-piece construction and embodies first and second ring-like sections disposed in axially spaced concentric relation. The ringlike sections are interconnected by a plurality of annularly spaced struts. Corresponding segments of the ringlike sections, disposed between a pair of struts, have oppositely disposed, spherically contoured surfaces in contact with a spherical element positioned therebetween.

12 Claims, 9 Drawing Figures

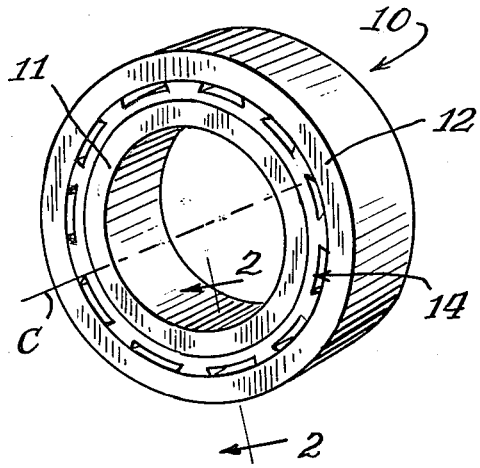
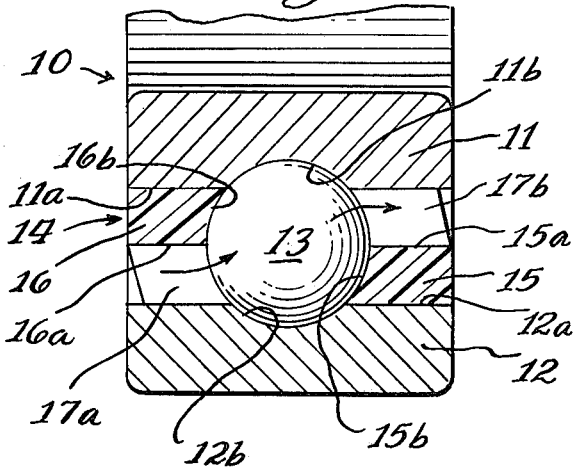
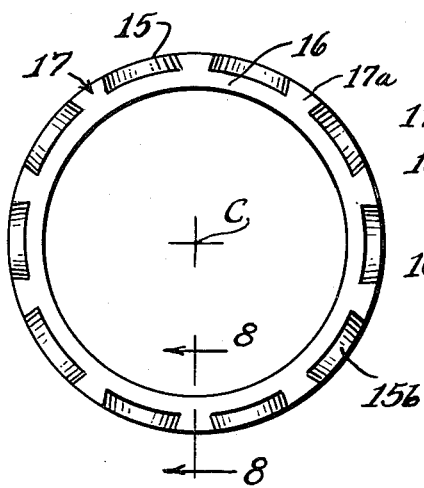
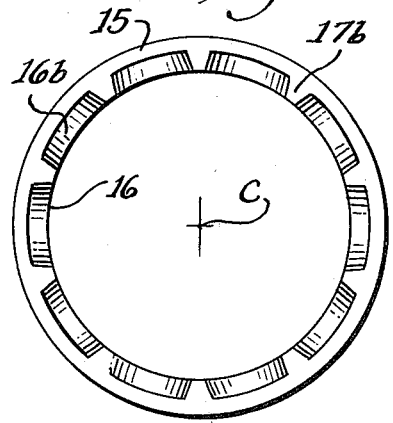
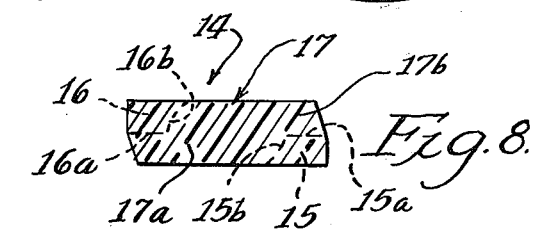
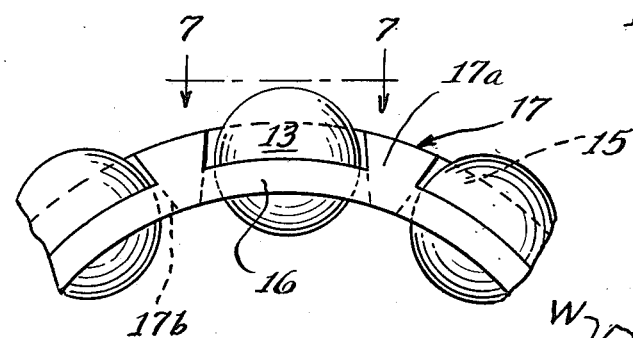
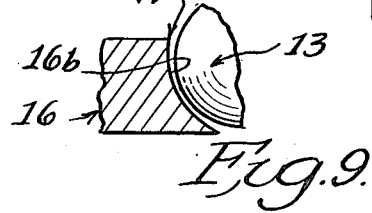

BEARING CONSTRUCTION AND RETAINER THEREFOR

BACKGROUND OF THE INVENTION

Various high-speed bearings have heretofore been provided; however, because of various inherent design characteristics, they have been beset with one or more of the following shortcomings: (a) it is difficult to properly lubricate the various components thereof and, thus, the wear life of the bearing is significantly shortened; (b) the retainer utilized is costly to manufacture because of the types of molds required to form the retainer; (c) it is difficult to assemble the various components; and (d) the retainer is structurally weak.

SUMMARY OF THE INVENTION

Thus, it is an object of the invention to provide a bearing and retainer therefor which readily avoid the aforenoted shortcomings.

It is a further object of the invention to provide a bearing and retainer therefor wherein the latter is of a skeletal design permitting ready flow of the lubricant therethrough.

It is a further object of the invention to provide a retainer for a bearing which is of a one-piece construction and formed by utilizing a simple two-piece mold.

It is a further object of the invention to provide a retainer for a bearing which is of sturdy, light weight, and inexpensive construction and has low inertia and therefore is particularly suitable for use in high speed bearings.

Further and additional objects will appear from the description, accompanying drawings and appended claims.

In accordance with one embodiment of the invention, a bearing is provided having inner and outer races arranged in concentric, radially spaced relation and a plurality of spherical elements disposed between and in rolling contact with said races. A molded one-piece retainer is disposed between the races and is in sliding contact therewith and effects annular spacing between adjacent spherical elements. The retainer includes first and second ringlike sections arranged in axially spaced substantially concentric relation. The first ringlike section has an inner annular surface, the diameter of which is at least as great as the diameter of the outer annular surface of the second ringlike section. The ringlike sections are interconnected by a plurality of symmetrically arranged struts. Each strut is disposed between a pair of spherical elements. The segments of the ringlike sections disposed between each pair of struts have spherically contoured surfaces in which a spherical element is in rolling contact. The contoured surfaces engage substantially diametrically opposed exterior portions of a spherical element and correspond substantially to the curvature of the spherical element exterior.

DESCRIPTION

For a more complete understanding of the invention reference should be made to the drawing wherein:

FIG. 1 is a perspective end view of one form of the improved bearing.

FIG. 2 is an enlarged fragmentary sectional view taken along line 2—2 of FIG. 1.

FIG. 3 is an elevational view of one end of the retainer per se embodied in the bearing of FIG. 1.

FIG. 4 is a right side elevational view of the retainer of FIG. 3.

FIG. 5 is similar to FIG. 3 but of the opposite end of the retainer per se.

FIG. 6 is an enlarged fragmentary end view of the retainer of FIG. 3 and showing the spherical elements assembled therewith.

FIG. 7 is an enlarged fragmentary top view taken along line 7—7 of FIG. 6.

FIG. 8 is an enlarged fragmentary sectional view taken along line 8—8 of FIG. 3.

FIG. 9 is an enlarged fragmentary sectional vertical view showing a portion of a spherical element and a contoured surface of the retainer separated from one another a hydrodynamic wedge of lubricant.

Referring now to the drawing and more particularly to FIG. 1, one form of the improved bearing 10 is shown. The bearing includes an inner race 11, an outer race 12, a plurality of spherical elements or balls 13 disposed between the races, and a retainer 14 also disposed between the races and retaining the elements 13 in a predetermined annularly spaced relation.

The inner and outer races 11, 12, respectively, are of conventional design and each has the surface 11a, 12a thereof adjacent the spherical elements 13 provided with a recess 11b, 12b engaged by an element 13, see FIG. 2. The recesses 11b, 12b have a concave configuration which conforms substantially to the exterior curvature of the element 13. Each element is in rolling contact with corresponding recesses 11b, 12b.

Retainer 14 is perferably a molded one-piece construction formed from a suitable plastic material (e.g., nylon or glass-filled nylon). The retainer 14 includes first and second substantially ringlike sections 15, 16 which are disposed in axially spaced concentric relation. Section 15, as seen in FIG. 2, has an annular inner surface 15a, the diameter of which is at least as great as the diameter of the annular outer surface 16a of the second section 16. The importance of this dimensional relationship will be discussed more fully hereinafter. The sections 15, 16 are interconnected to one another by a plurality of symmetrically arranged struts 17 which extend in directions substantially parallel to the axis C of the bearing containing the center of curvature of the ringlike sections 15 and 16. Each strut 17 is of like configuration and has an outer portion 17a which overlies in part the outer annular surface 16a of the section 16 and an inner portion 17b which overlies in part the inner annular surface 15a of section 15, see FIGS. 2 and 8.

The corresponding segments of the sections 15, 16, disposed between a pair of struts 17, have substantially spherically contoured surfaces 15b, 16b, the radius of each of which is slightly larger than the radius of the element 13, as seen more clearly in FIG. 9. By reason of this radial differential, a hydrodynamic wedge W of lubricant (oil) is formed between the surface 15b, 16b and the exterior of the element 13, when one of the races 11, 12 is rotating relative to the other about axis C. The surfaces 15b, 16b are arranged in substantially diametrically opposed relation with respect to one another.

Due to the skeletal configuration of retainer 14 lubrication of the elements is greatly facilitated particularly when the lubricant flows in a substantially axial direction, as seen by the arrows in FIG. 2, past the elements and between the two races 11, 12. While the lubricant when between the races is caused to be thrown radially outwardly by centrifugal force, it will nevertheless be diverted slightly inwardly by the retainer section 15 thereby resulting in effective lubrication of both races, as well as the elements and retainer. Thus, by reason of such flow, the useful life of the bearing can be significantly increased.

As a result of the dimensional relationship between sections 15 and 16 and the configuration and location of the struts 17, the retainer 14 can be readily formed utilizing only a two piece mold; rather than a conventional multi-piece mold requiring a plurality of cylindrical pins to form pockets in the retainer to accommodate the elements 13. In such an arrangement the pins were normally hydraulically actuated so as to reach into the cavity and then retracted to allow the retainer to be removed from the mold cavity. The use of molds of this type resulted in the mold being of complex and costly construction and also an increase in the cycle time for injection. These two factors added materially to the cost of the retainer of the prior art.

It is to be understood, of course, that the configuration and size of the bearing 10 and its components may vary from that shown without departing from the scope of the invention.

I claim:

1. A bearing comprising inner and outer races arranged in concentric radially spaced relation with respect to a common axis; a plurality of spherical elements disposed intermediate said races and in movable contact therewith; and a unitary retainer disposed intermediate said races and having said spherical elements in movable contact therewith and being separated thereby into annularly spaced relation, said retainer including first and second ringlike sections arranged in axially spaced concentric relation, said first section having an inner annular peripheral surface and said second section having an outer annular peripheral surface, the diameter of said first section inner surface being at least as great as the diameter of said second section outer surface, said first and second sections being interconnected by a plurality of struts arranged in annularly spaced relation, each strut being disposed between a pair of spherical elements, the segments of each ringlike section disposed intermediate said struts having contoured surfaces in substantial contact with said spherical elements, the contour of said contacting surfaces corresponding substantially to but slightly greater than the curvature of the exterior surface of said spherical elements.

2. The bearing of claim 1 wherein the retainer is of skeletal configuration and is of a molded one-piece construction.

3. The bearing of claim 1 wherein the contoured surfaces of said ringlike sections substantially contact diametrically opposed exterior surface portions of said spherical elements.

4. The bearing of claim 1 wherein the axial dimensions of said races and retainer are substantially the same.

5. The bearing of claim 1 wherein a portion of each strut overlies the outer annular peripheral surface of the second ringlike section.

6. The bearing of claim 5 wherein a second portion of each strut overlies the inner annular peripheral surface of the first ringlike section.

7. The bearing of claim 1 wherein the ringlike sections have centers of curvature disposed along said common axis and the struts are symmetrically arranged about said axis.

8. A retainer for use in a bearing having inner and outer races and a plurality of spherical elements disposed between said races and in rolling contact therewith, said retainer being positionable between the races and having the spherical elements in substantial movable contact therewith, said retainer comprising first and second ringlike sections arranged in axially spaced concentric relation about a common axis, said first section having an inner annular peripheral surface and said second section having an outer annular peripheral surface, the diameter of said first section inner surface being at least as great as the diameter of said second section outer surface; and a plurality of annularly spaced struts interconnecting said first and second sections, each strut being positionable between a pair of spherical elements; corresponding segments of the first and second sections disposed between a pair of struts having oppositely contoured surfaces for substantially movable contact by a spherical element disposed between said pair of struts.

9. The retainer of claim 8 being of molded one-piece skeletal construction.

10. The retainer of claim 8 wherein each strut has a portion thereof overlying the outer annular peripheral surface of said second ringlike section.

11. The retainer of claim 10 wherein each strut has a second portion thereof overlying the inner annular peripheral surface of said first ringlike section.

12. The retainer of claim 11 wherein the first and second ringlike sections have centers of curvature disposed along said common axis, and said struts are disposed in substantially parallel spaced relation with respect to said axis.

* * * * *